Patented May 14, 1929.

1,713,409

UNITED STATES PATENT OFFICE.

EDWARD A. TAYLOR, OF CLEVELAND, OHIO, ASSIGNOR, BY MESNE ASSIGNMENTS, TO THE GRASSELLI CHEMICAL COMPANY, OF CLEVELAND, OHIO, A CORPORATION OF DELAWARE.

PROCESS OF PURIFYING WATER-SOLUBLE METAL SULPHIDES.

No Drawing.   Application filed May 14, 1928. Serial No. 277,792.

Water soluble metal sulphides are usually produced by furnacing the corresponding sulphates with carbonaceous reducing agents. The furnace charges are then leached and the liquors concentrated and used as such, or treated to produce the solid sulphides.

These liquors are usually dark colored, due to contamination with various sulfur compounds other than the metal sulphides and other impurities originating possibly in the charge or from the apparatus in which the operation is performed. These impurities pass into the solid sulphides, which are then of dark color.

Pure white crystals of the metal sulphides and their light colored solutions are slowly decomposed in contact with air and become yellowish of straw colored. The impure, colored solutions of sulphides and solutions of the colored solid sulphides above referred to are designated hereafter as "technical" solutions or liquors.

I have now found a process whereby impure or technical solutions of soluble metal sulphides can be purified to yield practically colorless products.

This process consists in treating the impure or colored technical solutions with a small amount of a soluble cyanide.

Sodium cyanide is, for economical reasons, the most available reagent which can be used in my novel process, but other soluble cyanides such as potassium cyanide or even free hydrocyanic acid will, in a similar manner, bleach the colored solutions.

My novel process is best performed upon concentrated solutions of the sulphides. The bleaching effect is obtained at room temperature, but is speeded up at higher temperatures and at or near the boiling point of the solution is usually complete in a few minutes.

The chemistry of the decolorization process is not clearly understood, but it is probable either that the cyanide reacts with certain colored sulfur compounds which are present, forming colorless sulfo-cyanides, or else the cyanide reacts with the soluble iron which is present, forming a ferrocyanide. It is possible that one or both of these reactions may be involved.

The following examples will further illustrate my invention as applied to the most common technical solutions of sulphides, viz, solutions of sodium sulphide and of barium sulphide:

(1) 2.5 parts of sodium cyandie are added to 1000 parts of technical sodium sulphide liquor at 30–33° Bé. measured at 200° F. The solution is boiled for 15 minutes in an apparatus constructed of a material which is not materially attacked by such a solution. During the period of boiling the color of the liquid will gradually change from a dark amber to a light straw color, and on cooling will solidify into an only very slightly colored mass of sodium sulphide crystals corresponding to the formula $Na_2S.9H_2O$.

The decolorized solution can also be concentrated preferably in vacuum, and will yield light colored so-called fused sodium sulphide containing 60% $Na_2S$.

These operations are preferably performed in glass, enamel, zinc, or chrome-steel apparatus; iron must be excluded because it readily imparts color to hot sodium sulphide solutions which would then not be readily amenable to my bleaching process.

(2) In using 20 parts of sodium cyanide to 1000 parts concentrated sodium sulphide liquor, a more rapid and more complete decolorization is obtained. Larger amounts of cyanide do not produce any additional effect.

(3) Technical barium sulphide liquor as obtained by filtering the solution obtained by leaching a barium sulphide charge is usually straw or light amber colored. On standing, it turns dark red, probably due to the formation of polysulphides. Such colored solutions are objectionable for use, particularly in the manufacture of lithopone.

From 1 to 2 parts of sodium cyanide are added to 1000 parts of such a solution, and on boiling for a short period, say 5 to 10 minutes, practical decolorization is obtained. Such a solution can be used to advantage whenever a colored solution is objectionable.

The amount of the soluble cyanide to be used, the temperature, duration of action and concentration of the sulphide solutions, can all be varied within wide limits. It will be understood that dark colored solutions will require more cyanide and longer action or higher temperature than light colored ones.

I claim:

1. The process of bleaching a technical aqueous solution of a metal sulphide, which comprises reacting thereon with a small amount of a water soluble cyanide.

2. The process of bleaching a technical aqueous solution of a metal sulphide containing a colored sulphur compound, which comprises adding a small amount of a soluble cyanide thereto.

3. The process of bleaching a technical, colored inorganic sulphur compound containing, aqueous solution of a metal sulphide, which comprises adding sodium cyanide in an amount from about $\frac{1}{10}$ to about 2% of the weight of the solution, and boiling the solution until substantial decolorization is obtained.

4. In a process of producing practically colorless barium sulphide, the step which comprises adding a soluble cyanide to a colored, aqueous technical solution of barium sulphide.

5. The process which comprises reacting with sodium cyanide upon the liquor obtained by leaching a furnace charge of barium sulphide.

6. The process of bleaching an aqueous solution of barium sulphide containing a colored inorganic sulphur compound which consists in adding a small amount of sodium cyanide thereto.

7. The process of bleaching a technical, colored aqueous barium sulphide solution, which consists in adding sodium cyanide thereto in an amount from about $\frac{1}{10}$ to about 2% of the weight of the solution, and boiling the solution until substantial decolorization is obtained.

In testimony whereof, I affix my signature.

EDWARD A. TAYLOR.